＊
US009303680B1

(12) United States Patent
Deck et al.

(10) Patent No.: US 9,303,680 B1
(45) Date of Patent: Apr. 5, 2016

(54) SYSTEMS, METHODS, AND APPARATUS FOR A RETENTION TOOL

(71) Applicant: The Boeing Company, Chicago, IL (US)

(72) Inventors: Eric Deck, Ladue, MO (US); Amon Alan Chambers, North Charleston, SC (US); Travis Grimes, Mount Pleasant, SC (US); William Beaver, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 188 days.

(21) Appl. No.: 14/019,793

(22) Filed: Sep. 6, 2013

(51) Int. Cl.
*F16B 41/00* (2006.01)

(52) U.S. Cl.
CPC .................... *F16B 41/002* (2013.01)

(58) Field of Classification Search
CPC ........................................................ F16B 39/10
USPC .................. 411/119, 120, 517, 520
See application file for complete search history.

(56) References Cited

U.S. PATENT DOCUMENTS

| 486,147 | A | * | 11/1892 | Woodstock ................... 411/120 |
| 490,553 | A | * | 1/1893 | Grafflin, Jr. ................... 411/120 |
| 606,145 | A | * | 6/1898 | Hosier .......................... 411/120 |
| 688,308 | A | * | 12/1901 | Hunsaker ..................... 411/120 |
| 3,231,235 | A | * | 1/1966 | Anderson et al. ............ 251/214 |
| 3,630,107 | A | | 12/1971 | Carr |
| 3,665,791 | A | | 5/1972 | Carr |
| 4,112,988 | A | | 9/1978 | Nelson |
| 4,734,001 | A | * | 3/1988 | Bennett ......................... 411/119 |
| 4,811,647 | A | | 3/1989 | Lindamood |
| 4,906,150 | A | * | 3/1990 | Bennett ......................... 411/119 |
| 5,323,673 | A | | 6/1994 | Martinez et al. |
| 5,460,351 | A | * | 10/1995 | Holloway ..................... 251/214 |
| 5,603,594 | A | * | 2/1997 | Lincoln ......................... 411/84 |
| 5,890,861 | A | * | 4/1999 | Kaiser et al. ................. 411/426 |
| 6,170,363 | B1 | | 1/2001 | Hu |
| 6,287,065 | B1 | | 9/2001 | Berlin |
| 6,889,581 | B2 | | 5/2005 | Chen |
| 7,437,975 | B1 | | 10/2008 | De Anfrasio |
| 8,245,605 | B1 | | 8/2012 | Rygh |
| 2010/0186556 | A1 | | 7/2010 | Lin |
| 2010/0294087 | A1 | | 11/2010 | Hu |
| 2015/0089786 | A1 | * | 4/2015 | Coffland et al. ............. 29/426.1 |

* cited by examiner

*Primary Examiner* — Roberta Delisle
(74) *Attorney, Agent, or Firm* — Kwan & Olynick LLP

(57) ABSTRACT

Systems, methods, and apparatus are disclosed for retaining a fastening element in a retention tool. The retention tool may include a housing that includes a socket configured to receive fastening elements. The retention tool may further include a torque restrictor that is coupled to the housing, and is configured to transfer a rotational force to the fastening elements. The retention tool further includes a retention plate coupled to the housing and configured to retain the fastening elements in the socket. The retention plate may have a first resistance configured to enable the insertion of the fastening elements into the socket in a first direction in response to a first application of a first force. The retention plate may also have a second resistance configured to enable the removal of the fastening elements from the socket in a second direction in response to a second application of a second force.

16 Claims, 7 Drawing Sheets

SYSTEMS, METHODS, AND APPARATUS FOR A RETENTION TOOL

TECHNICAL FIELD

This disclosure generally relates to vehicles and machinery and, more specifically, to tools that may be used during one or more processes associated with aircraft.

BACKGROUND

During assembly of aircraft, spacecraft, automobiles and other machinery, fastening elements, such as nuts and washers, are to be held in place while a fastening device, such as a bolt, is installed in a joint or seam. However, some of the areas where the nuts and washers are to be held may be inaccessible and cannot be seen by the operator installing the bolt. The small access compartments and blind access points often cause the operator to drop the nuts and washers in the access compartment. In some industries, such as the aerospace industry, if the nut and washer is dropped, they must be retrieved before installation work can proceed to prevent foreign object debris (FOD) in the aircraft. This retrieval can be time consuming because of the tight and inaccessible areas in an aircraft. Conventional methods of fastening elements, such as nuts and washers, remain limited because they do not provide the ability to effectively and efficiently hold the washer and nut in place and release the washer and nut when a bolt is installed.

SUMMARY

Provided are one or more tools which may be used with machines or vehicles, such as airplanes. The tools disclosed herein may be retention tools that retain one or more structural elements, such as fastening elements, during a process that may be associated with a machine or vehicle, such as assembly or maintenance. In this way, the tools disclosed herein may prevent the generation of foreign object debris (FOD) hazards that may result from fastening elements that have been dropped during an assembly, maintenance, or installation process.

Thus, according to some embodiments, an apparatus that may be a retention tool is disclosed. The apparatus may include a housing including a first socket, the first socket being configured to receive the at least one fastening element. The apparatus may also include a torque restrictor coupled to the housing and located adjacent to the first socket, the torque restrictor being configured to transfer a rotational force to the at least one fastening element. The apparatus may further include a retention plate coupled to the housing and configured to retain the at least one fastening element in the first socket, the retention plate having a first resistance configured to enable the insertion of the at least one fastening element into the first socket in a first direction in response to a first application of a first force, and the retention plate having a second resistance configured to enable the removal of the at least one fastening element from the first socket in a second direction in response to a second application of a second force.

In some embodiments, the retention plate includes an edge defining an opening, where the edge has at least a tapered profile. In various embodiments, the torque restrictor is included in the housing. The torque restrictor may comprise a different material than the housing. Moreover, the housing may further comprise a handle coupled to the first socket. In some embodiments, a length and an angle associated with a geometry of the handle is configured to fit within one or more dimensions of an access compartment of an airplane. The housing may further include a plurality of sockets configured to receive a plurality of fastening elements, wherein the plurality of sockets includes a second socket and a third socket. In some embodiments, a distance between each of the first socket, the second socket, and the third socket is configured to match a distance between each of a plurality of fastening devices included in a component of an airplane, and a curvature of the housing is configured to match a curvature of the component. In some embodiments, the apparatus further includes an overmold that covers the housing. The overmold may be made of the same material as the retention plate, and the retention plate may be included in the overmold.

In various embodiments, a system for retaining at least one fastening element is disclosed. The system may include a housing including a first socket, the first socket being configured to receive the at least one fastening element. The system may also include a torque restrictor coupled to the housing and located adjacent to the first socket, the torque restrictor being configured to transfer a rotational force to the at least one fastening element. The system may further include a handle coupled to the housing and configured to transfer a rotational force to the housing. The system may also include a retention plate coupled to the housing and configured to retain the at least one fastening element in the first socket, the retention plate having a first resistance configured to enable the insertion of the at least one fastening element into the first socket in a first direction in response to a first application of a first force, and the retention plate having a second resistance configured to enable the removal of the at least one fastening element from the first socket in a second direction in response to a second application of a second force. In various embodiments, the handle may be removably coupled to the housing.

In various embodiments, a method for retaining at least one fastening element is disclosed. The method may comprise: (a) applying a first force to the at least one fastening element, the first force pushing the at least one fastening element through a retention plate of a retention tool and into a housing of the retention tool, the first force being determined based on a first resistance of the retention plate; (b) aligning the retention tool with a fastening device, the aligning enabling mechanical coupling of the at least one fastening element with the fastening device; (c) coupling the at least one fastening element to the fastening device; and (d) applying a second force to the at least one fastening element, the second force removing the at least one fastening element from the housing of the retention tool, the second force being determined based on a second resistance of the retention plate.

In some embodiments, the retention plate includes an edge that defines an opening, and the first resistance may be determined, at least in part, by a first tapered profile of the edge. Furthermore, the second resistance may be determined, at least in part, by a second tapered profile of the edge. In some embodiments, the method further comprises repeating steps (a) through (d) for each of a plurality of fastening devices included in an airplane component.

DETAILED DESCRIPTION

Figure 1A:
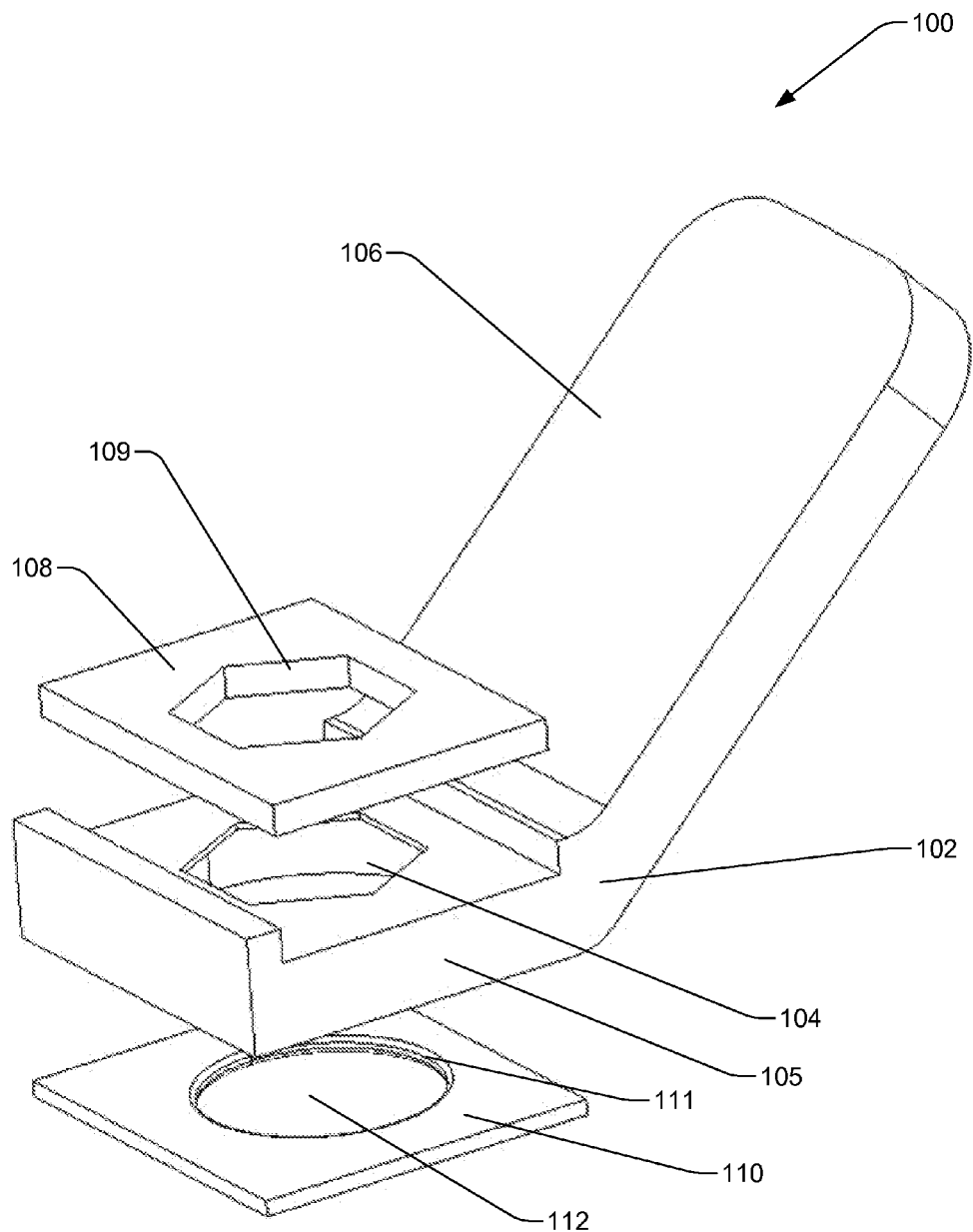
FIG. 1A illustrates a first view of an example of a retention tool, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Conventional tools do not provide the ability to effectively hold fastening elements in place during an assembly process that may involve small access compartments and gang-channels. For example, conventional wrenches and sprockets may have a resilient member within an opening or a magnet within an opening to secure a nut to the wrench or sprocket as the tool is used to move the nut into position. However, such tools only hold the nut, but not the washer. Moreover, such tools are not capable of holding the nut and a stack of washers. As such, operators often resort to temporarily gluing the stack of washers and a nut (also referred to herein as a stack-up) to their finger as they position the stack-up in the inaccessible area. However, this may be deleterious to the operator's health, is inefficient, and may still result in FOD hazards.

Various embodiments of tools disclosed herein include a housing that has at least one opening or socket that may be configured to receive a stack-up of individual fastening elements. The at least one opening or socket may be at least partially obstructed by a retention plate, which may comprise a pliant material that holds the stack-up in the opening or socket. Thus, the tool may temporarily retain several fastening elements, such as a flanged nut and washer(s), prior to a mating screw/bolt installation. The tool may allow the washer (s) and flanged nut stack-up to be pulled through a flexible opening of the tool, thus resulting in a final installation of the bolt/screw, washers, and nut without requiring the operator to hold the washers and nut individually. The tool may be configured for multiple joint installations or single installations.

Accordingly, various embodiments of the tool disclosed herein may be used to position and hold a stack-up of a nut and at least one washer in an inaccessible and/or not visible area as a bolt is secured through the nut and washer(s). The tool may be configured based on the location where the stack-up (s) will be positioned. The tool may include, among other components, a housing and a retention plate which may be made of a pliant material that does not separate from the housing during operation. The tool may also include a handle. In situations where multiple bolts are installed, the housing may be configured to include a plurality of sockets or openings that are each configured to receive a stack-up of a nut and at least one washer. For example, the housing may have 3 or 8 sockets or openings. The housing may be coated with the pliant material such that at least a portion of each socket or opening is obstructed, and the pliant material also functions as an overmold. By obstructing the sockets or openings, the stack-up is retained inside the tool even as the tool is moved into position and the bolt is installed. In some embodiments, the retention plate may deflect as the tool is removed from the stack-up after the bolt is secured.

In various embodiments, the housing may include slots defined therethrough and channels near the sockets or openings which may be in the upper surface of the housing. During a fabrication process, as a pliant material flows over the housing before being set, the pliant material fills the slots and/or channels to secure the material to the housing when the material is cured. In some embodiments, the pliant material completely covers the bottom, edges, and sides of the housing. When covered in this way, composite material and/or other material is protected from damage if the tool is dropped. Moreover, if the tool is dropped, the stack-ups are retained in the sockets or openings to make retrieval of the stack-ups and tool easier.

The housing may also be coupled to or include a torque restrictor which may be used to transfer a rotational force to a stack-up. The torque restrictor may be a plate that is coupled to an upper surface of the housing to reinforce the openings or sockets for securing the stack-ups as a bolt is tightened. The torque restrictor may include openings corresponding to the socket or opening of the housing and having a shape corresponding to the shape of the fastening elements. The torque restrictor may be a separable plate or can be included as part of the tool handle. In use, an operator or user will "load" a stack-up of fastening devices, such as a flanged nut and washer(s), into the tool, then place the tool in the location desired for the bolt installation. Using the handle, the operator may hold the tool in place and start the bolt either by hand or with a standard installation tool. Once the joint is secure, the washers will be forced out of the socket or opening and the tool may be removed from the joint.

FIG. 1A illustrates a first view of an example of a retention tool, in accordance of some embodiments. As previously discussed, in situations in which access to a bolt is blind and the consequences of FOD hazards make them unacceptable, preventing the dropping of objects such as fastening elements may be difficult, but may be instrumental in an efficient assembly process. Accordingly, retention tool 100 may be a tool that is configured to retain or hold at least one fastening element, such as a nut and/or washer, in place during a process in which the at least one fastening element is fastened. Retention tool 100 may be configured to hold a plurality of fastening elements, such as a nut and stack of washers referred to herein as a stack-up, securely such that the elements of the stack-up remain adjacent to each other and aligned despite the application of various forces. For example, if retention tool 100 is dropped, retention tool 100 may continue to securely hold the components of the stack-up in place and aligned with each other. Retention tool 100 may be further reconfigured to release the stack-up in response to various forces. For example, when the stack-up is mechanically coupled to a bolt, retention tool 100 may release the stack-up. Thus, retention tool 100 may be configured to retain or hold a stack-up in some conditions, while being further configured to release the stack-up in other conditions. In various embodiments, retention tool 100 may include, among other elements, housing 102, handle 106, torque restrictor 108, and retention plate 110.

Housing 102 may be a structural member that includes and provides structural support for one or more elements of retention tool 100. In some embodiments, housing 102 may be made of a plastic polymer, or other material that may be used in a fabrication process such as rapid prototyping. In various embodiments, housing 102 may be made of a metal or an alloy. For example, housing 102 may be made of forged steel. Thus, housing 102 and any other component coupled to or included in housing 102 may comprise a material configured to have sufficient rigidity to prevent free rotation of one or more fastening elements that have been inserted into retention tool 100. Accordingly, housing 102 may be made of metal, polymer-based plastics, forged steel, or any other suitable material.

Housing 102 may include portion 105 that may include a space or opening, such as first socket 104. In various embodiments, first socket 104 is an opening or space that may be configured to hold or retain at least one fastening element. Thus, first socket 104 may be a socket that provides a space or cavity within which at least one fastening element may be held or retained. As discussed in greater detail below with reference to FIG. 5, a plurality of fastening elements, such as a stack-up that includes a washer and a nut, may be inserted into retention tool 100 and retained within first socket 104 until the fastening elements are coupled to another element, such as a bolt. Accordingly, first socket 104 may be configured to have a geometry specific to a particular type of fastening element. For example, if retention tool 100 is being used with hexagonal nuts, first socket 104 may be configured to have a hexagonal geometry with side lengths slightly larger than the side lengths of the hexagonal nuts. In another example, first socket 104 may have a circular or columnar geometry to accommodate a particular washer. In this example, the washer may have an outer diameter of 0.6 inches and first socket 104 may have an inner diameter of 0.64 inches. It will be appreciated that other geometries and dimensions may be used as well. Thus, the geometries and dimensions of first socket 104 and other components of retention tool 100 may be configured based on any fastening element shape that is to be used with retention tool 100. Moreover, while first socket 104 is shown as a closed socket, first socket 104 and housing 102 may also be configured as an open socket.

Housing 102 may further include handle 106 which may be a structural member coupled to or connected to portion 105 of housing 102. Handle 106 may be configured to provide a structural member or element that may be held or grasped by a user. Thus, as discussed in greater detail below with reference to FIG. 5, a user may hold and position retention tool 100 by holding and manipulating handle 106. In this way, a user may easily position and hold retention tool 100, as well as fastening elements retained within retention tool 100, during blind installations within access compartments used during an assembly or manufacturing process. For example, a user may use handle 106 to hold retention tool 100 in a particular position while retention tool 100 is in an access compartment of an empennage section of a commercial airliner. In some embodiments, handle 106 may include an offset extension that is configured to extend the reach of an operator or user.

In various embodiments, handle 106 may be comprised of materials similar to those previously discussed with reference to housing 102. For example, handle 106 may be made of a plastic polymer, metal, or metallic alloy. In some embodiments, handle 106 may be made of the same material as portion 105. Alternatively, handle 106 may be made of a different material than portion 105. For example, portion 105 may be made of forged steel, while handle 106 may be made of plastic.

In some embodiments, handle 106 may also be configured to have geometries or dimensions that are customized based on a user and an environment in which the user operates. For example, handle 106 may have dimensions and geometries configured for use by a particular user in a particular access compartment. Accordingly, the angle at which handle 106 couples to portion 105 may be determined based on a size, depth, or amount of clearance space present in an access compartment of a portion of an airplane, such as the forward section. Thus, a length, width, and depth of handle 106 and other components of retention tool 100 may be configured based on compartment dimensions and a particular installation configuration that may be used for that compartment, such as using a stackup that includes two washers instead of one.

In various embodiments, handle 106 is detachable. Accordingly, handle 106 may be removably coupled to housing 102 such that handle 106 may be attached to or detached from portion 105 of housing 102. Thus, housing 102 may further include a fastening device, such as a clamp which may be lockable, that is configured to couple and decouple portion 105 and handle 106. Moreover, while FIG. 1A illustrates retention tool 100 that includes or may be attached to handle 106, other configurations of retention tool 100 are contemplated and disclosed herein. For example, retention tool 100 may include portion 105 of housing 102 that includes first socket 104, but might not include any handle at all.

In various embodiments, retention tool 100 may also include torque restrictor 108 which may be a structural element that facilitates delivery of a force, which may be a rotational force such as a torque, to at least one fastening element that may be retained in retention tool 100. Torque restrictor 108 may be coupled to portion 105 of housing 102, and may be located adjacent to first socket 104. For example, torque restrictor 108 may be a plate attached to or connected to a top surface of portion 105. Thus, torque restrictor 108 may facilitate the delivery and control of torque applied to at least one fastening element that may be retained in first socket 104. Torque restrictor 108 may include second socket 109 which may be a space or opening configured to retain or hold a portion of a fastening element, such as a nut, and apply a force to the fastening element. As similarly discussed above with reference to first socket 104, second socket 109 may be configured to have geometries and dimensions that are specific to a particular fastening element. For example, second socket 109 may have a hexagonal geometry for hexagonal nuts. Torque restrictor 108 may comprise a material such as a plastic polymer, metal, or metallic alloy.

As previously discussed, torque restrictor 108 may be coupled to housing 102. In some embodiments, torque restrictor 108 may be removably coupled to housing 102. Thus, differently configured torque restrictors may be swapped in and out of a single housing. For example, torque restrictor 108 may be decoupled from housing 102 and a different torque restrictor may be coupled instead. Alternatively, according to various embodiments, torque restrictor 108 may be included in and integrated with housing 102. Thus, torque restrictor 108 may permanently coupled to housing 102 by one or more manufacturing processes, such as welding. As similarly discussed above, various embodiments of torque restrictor 108 are contemplated and disclosed herein which may be open ended or closed ended.

In some embodiments, torque restrictor 108 may be configured to include a ratcheting device which may be configured to allow movement in a first direction and prevent movement in a second direction. In this way, torque restrictor 108 may be configured to facilitate the application or delivery of a force to a fastening element in a particular direction while preventing delivery of the force in another direction. While various embodiments disclosed herein describe retention tool 100 as including torque restrictor 108, in some embodiments, torque restrictor 108 is optional, and is not included in retention tool 100. Thus, the torque restriction functionality described above may be provided by an element of housing 102, such as first socket 104.

In various embodiments, retention tool 100 further includes retention plate 110 which may be a pliable or flexible plate or membrane configured to retain or hold one or more fastening elements in retention tool 100. As similarly discussed above, to prevent FOD hazards caused by dropped fastening elements, retention tool 100 may retain or hold fastening elements until the fastening elements are used in an assembly or installation process, such as when they are coupled to another element which may be a bolt. Thus, retention plate 110 may facilitate retention of at least one fastening element despite the application of various forces, such as dropping or jarring of retention tool 100. Retention plate 110 may further facilitate the release of the at least one fastening element when a different force is applied, such as the coupling of a bolt.

According to various embodiments, retention plate 110 may be configured to facilitate retention or release of at least one fastening element by being configured to have a first resistance, elasticity, and/or flexibility in a first direction, and being further configured to have a second resistance, elasticity, and/or flexibility in a second direction. The first resistance in the first direction may be relatively small and may permit movement in a direction inwards with relation to first socket 104. For example, the first resistance may be small enough to permit a user to easily insert a stack-up into first socket 104. The second resistance in the second direction may be relatively large and prevent movement in a direction outwards with relation to first socket 104. Thus, the second resistance may prevent movement in the second direction in response to the application of forces of a smaller magnitude, while also permitting movement in the same direction in response to the application of forces of a larger magnitude. For example, the second resistance may be large enough to prevent a stack-up from being released from first socket 104 when various forces, such as drops, jarring, and mechanical vibrations, are applied. However, at the same time, the second resistance may be small enough to permit release of the stack-up when a bolt is threaded through the stack-up and used to pull the stack-up out of retention tool 100.

In various embodiments, retention plate 110 is fabricated from an elastomer and has an opening, such as opening 112, that is small enough to retain at least one fastening element, such as a washer, prior to one or more installation operations which may be associated with the installation of one or more fastening devices, such as bolts. However, the material that comprises retention plate 110 may be expandable or flexible enough for the at least one fastening element to pass through retention plate 110 without damaging the elastomeric material. For example, retention plate 110 may be configured to have elastic properties and physical geometries such that as the washer begins to "trap" the elastomer of the retention plate during an installation operation, such as the tightening of a bolt, the inner radius provides a surface for the fastening element outer diameter to slide against, thus effectively increasing the opening diameter of retention plate 110 and allowing the at least one fastening element, such as a nut/washer stackup, to pass through the opening. For example, a 0.1 inch overlap between a fastening element outer diameter and retention plate 110 inner diameter may enable the fastening element to be retained prior to one or more installation operations, and further enable the fastening element to be released during the one or more installation operations.

Retention plate 110 may include edge 111 which may define a space or opening, such as opening 112. Edge 111 may have a diameter that is slightly smaller than a fastening element that is retained in retention tool 100. For example, the diameter of edge 111 may be slightly smaller than a washer retained in first socket 104. In this example, the outer diameter of the washer may be 0.6 inches and the inner diameter of edge 111 may be 0.58 inches. Alternatively, the diameter of edge 111 may be the same as the nut or washer, such that edge 111 fits snugly around the fastening element. In this example, retention plate 110 has a lateral flexibility which permits retention plate 110 to flex slightly and fit around the fastening element. As similarly discussed above, opening 112 may have various geometries and dimensions that may be selected and configured based on the fastening elements to be used with retention tool 100. For example, the diameter and geometry of edge 111 and opening 112 may be configured to match a washer that is to be retained in first socket 104. In various embodiments, edge 111 may be configured to have a profile geometry that facilitates insertion and retention of at least one fastening element. For example, edge 111 may be configured to have a tapered profile, a stepped profile, or a lip or ridge. Edge profiles are discussed in greater detail below with reference to FIG. 4.

In some embodiments, retention plate 110 includes a standoff which introduces a physical distance or offset between retention tool 100 and a surface that may include a fastening device, such as a bolt, that the at least one fastening element retained in retention tool 100 is being coupled to. The standoff may be configured to introduce the distance or offset to facilitate removal of the stack-up from first socket 104 without trapping retention plate 110 between a fastening element, such as a washer, and the surface, which may be the surface of an airplane. The distance or offset generated by the standoff may be determined based on a flexibility of retention plate 110. For example, if retention plate 110 flexes outwards a large amount when a stack-up is removed from first socket 104, the standoff may introduce a large offset or distance. The opposite may be true when less flexible materials are used to make retention plate 110. While various embodiments described herein include a standoff, embodiments are also contemplated and disclosed that do not include a standoff.

Furthermore, while FIG. 1A illustrates retention plate 110 as being a single plate in contact with a surface of portion 105 of housing 102, in some embodiments, retention plate 110 is part of a layer that coats or covers the entire external surface of retention tool 100. Thus, retention plate 110 may be part of a coating or an overmold that covers the entire structure of retention tool 100. When retention tool 100 is covered by the material used to make retention plate 110, the entire external surface of retention tool 100 may be a flexible and elastic coating, thus minimizing or eliminating damage that may result from retention tool 100 being dropped on a surface. For example, if retention tool 100 is being used to assemble a portion of an airplane and is dropped, the airplane's surface, which may be carbon fiber, will not be damaged. In this example, the overmold may have a thickness of between 0.04 inches to 0.06 inches. In some embodiments, the overmold only covers portion 105, and does not cover handle 106.

While FIG. 1A illustrates retention tool 100 as being configured to receive one stack-up, various embodiments are disclosed herein that are configured to receive a plurality of stack-ups. Thus, housing 102 may include multiple sets of sockets, torque restrictors, and retention plates that are each configured to receive at least one fastening element. In this way, a single retention tool may be used to hold and retain multiple stack-ups at the same time. For example, a particular portion of an airplane, such as a vertical section of the plane's empennage, may have several fasteners along a length of the vertical section. Retention tool 100 may be configured to have multiple sockets that are configured based on a geometry of the plane or access compartment. In this example, the spacing between sockets may be configured to match the spacing between fastening points in the vertical section. Moreover, the surface of the section may be curved. Accordingly, housing 102 may be configured to have a curvature which matches the curvature of the plane section. In this way, retention tool 100 may be customized and configured specifically for a particular joint or seam and may hold fastening elements in place for multiple fastening points within the joint or seam.

In some embodiments, a set of retention tools may be configured for a particular section of a plane. Returning to the previous example, the vertical section of the empennage may have 15 fasteners in a line. The top and bottom portions of the vertical section may be narrow and curved and may thus utilize retention tools with smaller geometries. Accordingly retention tools that may have 3 sockets may be used for the top and bottom. The middle portion of the vertical section may be straighter and more open. Accordingly, a retention tool having 8 sockets may be used for the middle portion.

Figure 1B:
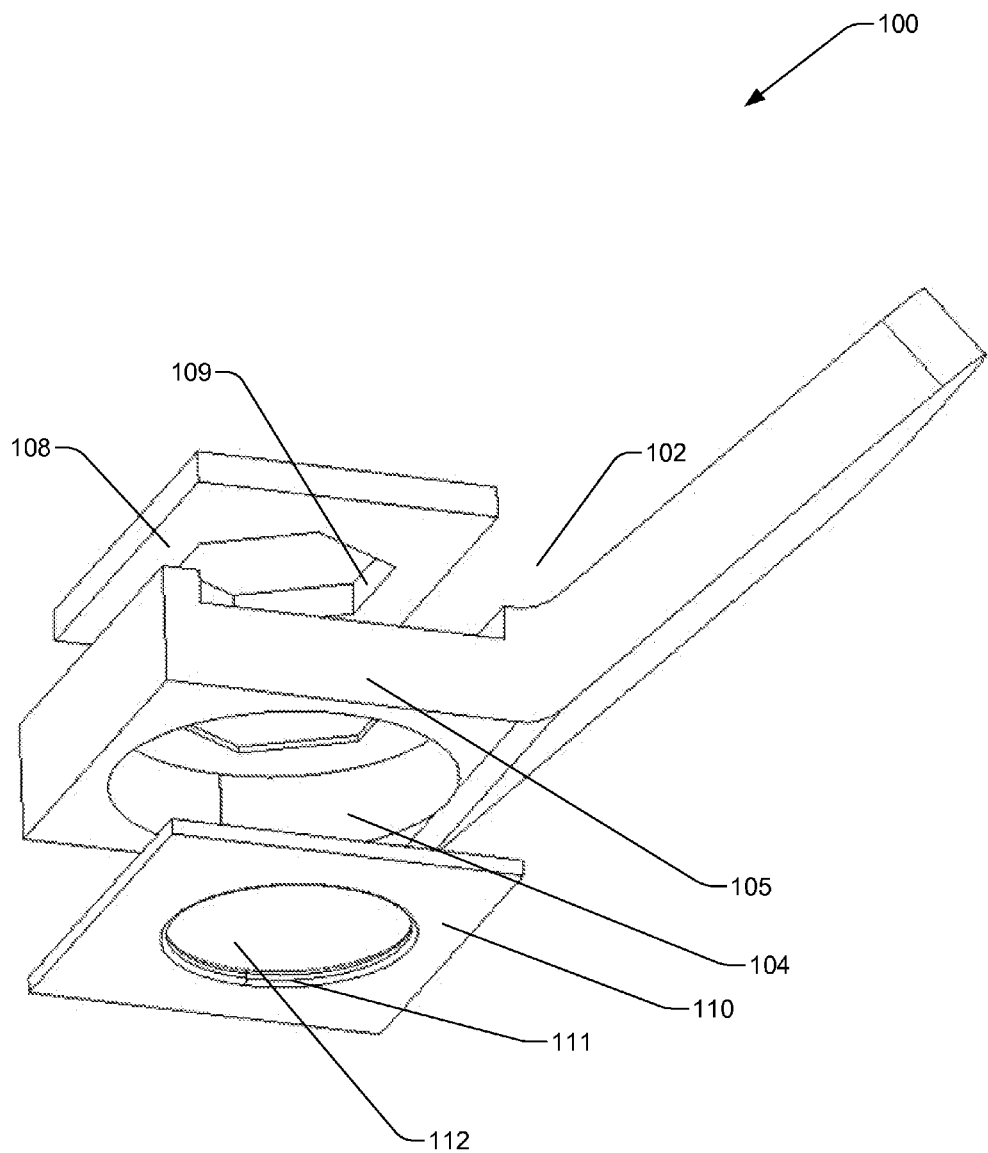
FIG. 1B illustrates a second view of the example of the retention tool, in accordance with some embodiments.

FIG. 1B illustrates a second view of the example of the retention tool, in accordance with some embodiments. The second view provided in FIG. 1B is a side view of retention tool 100 that also illustrates a bottom side of retention tool 100. As discussed above with reference to FIG. 1A, retention tool 100 may include housing 102 which may have portion 105 and first socket 104. Retention tool 100 may also include torque restrictor 108 that includes second socket 109. Retention tool 100 may further include retention plate 110 which may include edge 111 and opening 112. As illustrated in the view provided by FIG. 1B, at least one fastening element may be inserted or pushed into retention tool 100 by inserting the at least one fastening element through opening 112 of retention plate 110 and into first socket 104 and second socket 109. Once inserted, retention plate 110 may retain the at least one fastening element in retention tool 100 until a sufficient force is applied to cause their release, which may be when a fastening device, such as a bolt, is threaded through the at least one fastening element and tightened.

Figure 2:
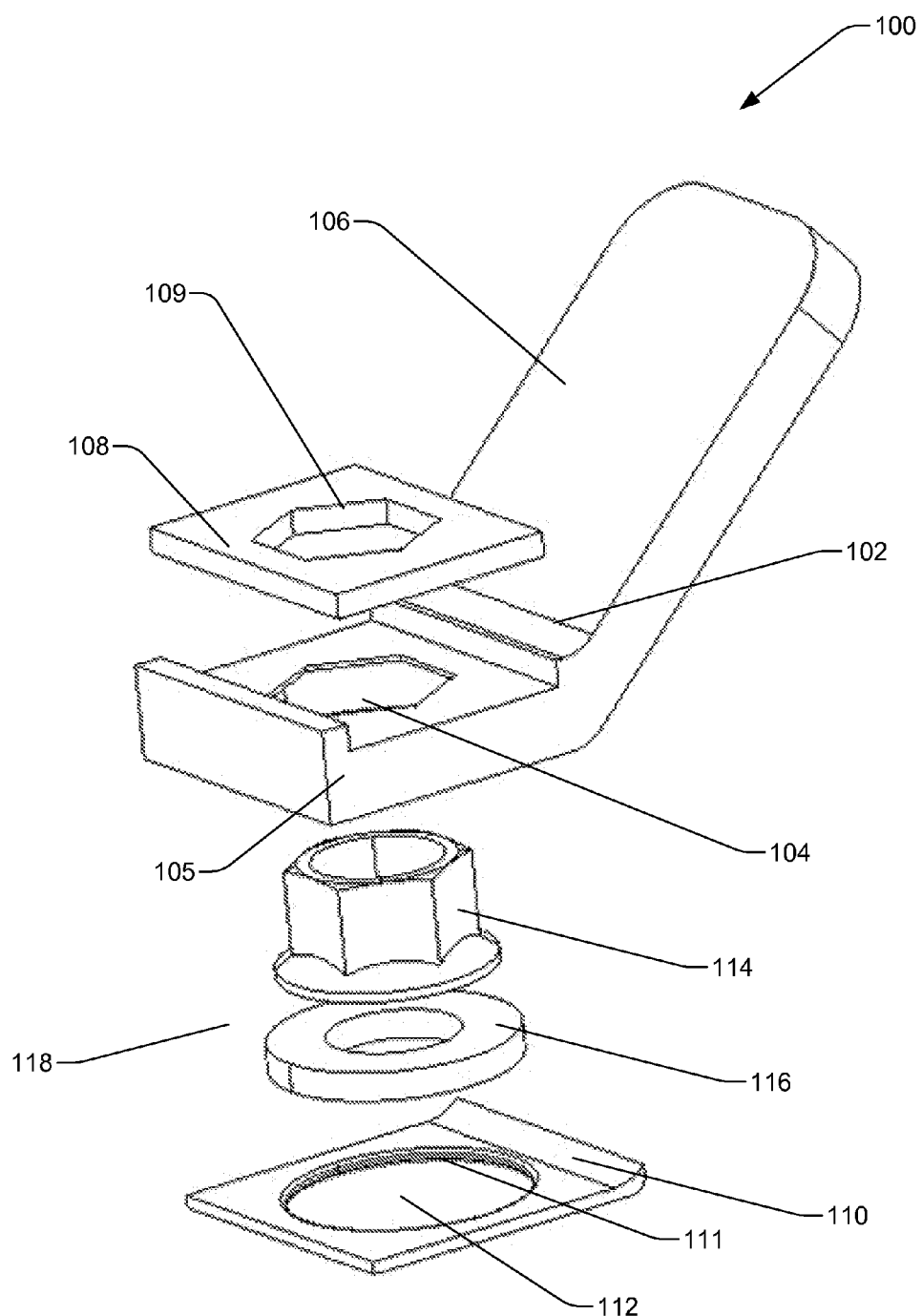
FIG. 2 illustrates an exploded view of an example of a retention tool that retains a fastening element, in accordance with some embodiments.

FIG. 2 illustrates an exploded view of an example of a retention tool that retains one or more fastening elements, in accordance with some embodiments. As similarly discussed above with reference to FIG. 1A and FIG. 1B, retention tool 100 may include housing 102 that includes portion 105, which may further include first socket 104. Retention tool 100 may also include handle 106 and torque restrictor 108, which may include second socket 109. Retention tool 100 may further include retention plate 110, which may include edge 111 and opening 112. As further illustrated in FIG. 2, retention tool 100 may also include first fastening element 114 and second fastening element 116. In the example shown in FIG. 2, first fastening element 114 is a flanged nut and second fastening element 116 is a washer. When first fastening element 114 is placed on top of second fastening element 116, the stack of both fastening elements may be referred to as stack-up 118.

As shown in FIG. 2, stack-up 118 may be inserted into and retained within an interior volume or space defined by first socket 104, second socket 109, and retention plate 110. As similarly discussed above, retention plate 110 may have resistive, flexible, and/or elastic properties. In some embodiments, once stack-up 118 is inserted into retention tool 100 and through retention plate 110, one or more elastic properties of retention plate 110 may generate a force applied to the bottom of stack-up 118. The generated force may hold and retain stack-up 118 in place within retention tool 100. As similarly discussed above, other geometries of opening 112 may also be used. Accordingly, a lateral flexibility defined by a flexibility of retention plate 110 along a plane parallel to retention plate 110 may be generated and applied to one or more side surfaces of stack-up 118 to retain stack-up 118 in retention tool 100. For example, a force generated by the lateral elasticity or flexibility of retention plate 110 may be applied by edge 111 to a side surface of second fastening element 116, which may be a washer.

Figure 3:
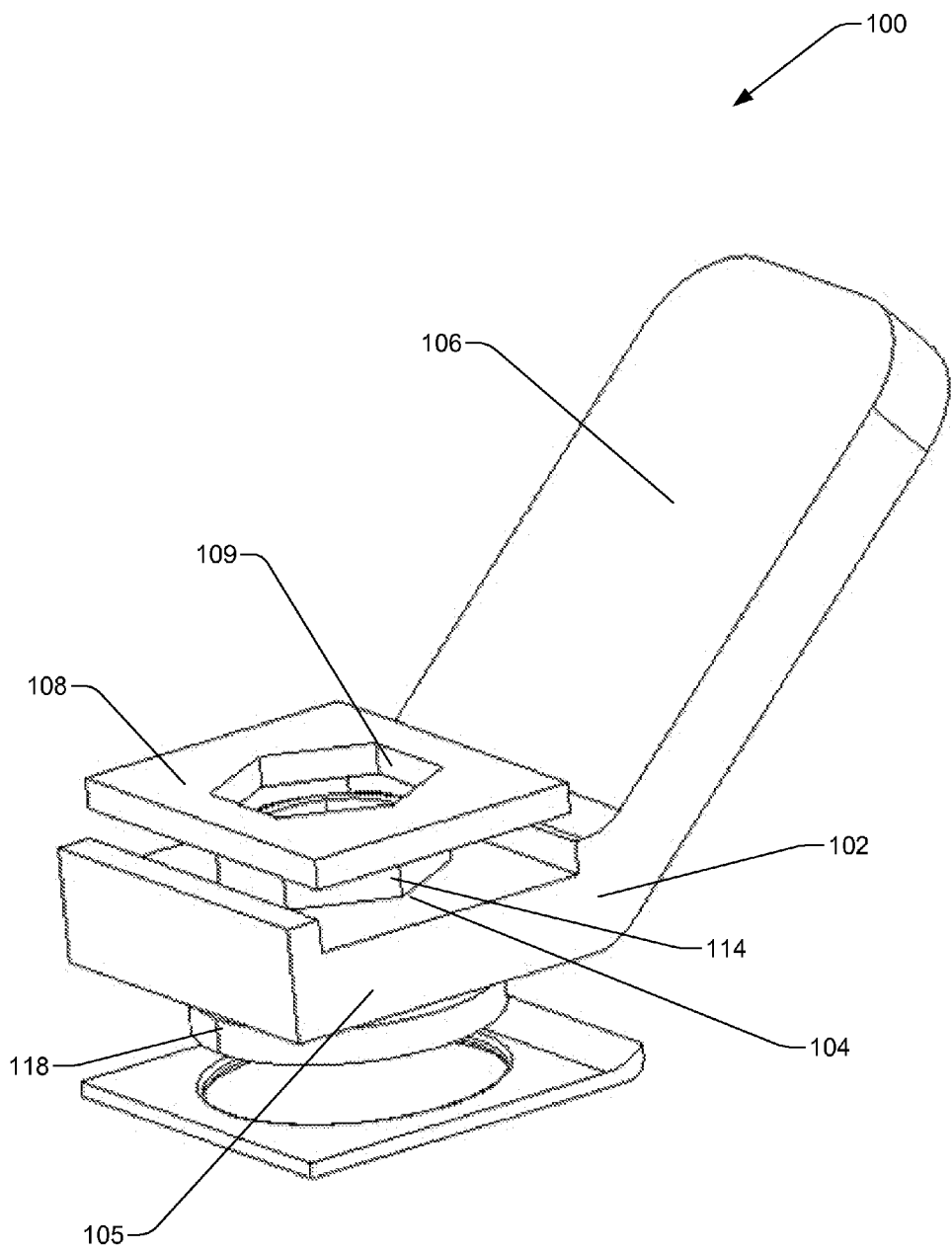
FIG. 3 illustrates another exploded view of the example of the retention tool that retains the fastening element, in accordance with some embodiments.

FIG. 3 illustrates another exploded view of the example of the retention tool that retains one or more fastening elements, in accordance with some embodiments. As similarly discussed above with reference to FIG. 2, stack-up 118 may be inserted into and retained within retention tool 100. FIG. 3 illustrates how one or more of first socket 104 and second socket 109 may be configured to provide one or more points of contact between housing 102 and/or torque restrictor 108 and stack-up 118. Once the one or more points of contact have been formed, a rotational force or torque may be transferred to stack-up 118. The rotational force or torque may be generated by a user turning or rotating handle 106 of retention tool 100. In some embodiments, the rotational force or torque may be generated in opposition to a rotation or turning of stack-up 118 itself, which may occur when a bolt has been threaded into stack-up 118 and is being tightened.

For example, second socket 109 of torque restrictor 108 may have a diameter or dimensions slightly larger than first fastening element 114. Once first fastening element 114 has been inserted into retention tool 100, torque restrictor 108 may fit closely around a top portion of first fastening element 114, and edge surfaces of second socket 109 may provide one or more points of contact between torque restrictor 108 and first fastening element 114. Similarly, first socket 104 may be configured such that edge surfaces of first socket 104 provide one or more points of contact between portion 105 of housing 102 and stack-up 118. In operation, a rotational force or torque may be transferred through the one or more points of contact.

Figure 4:
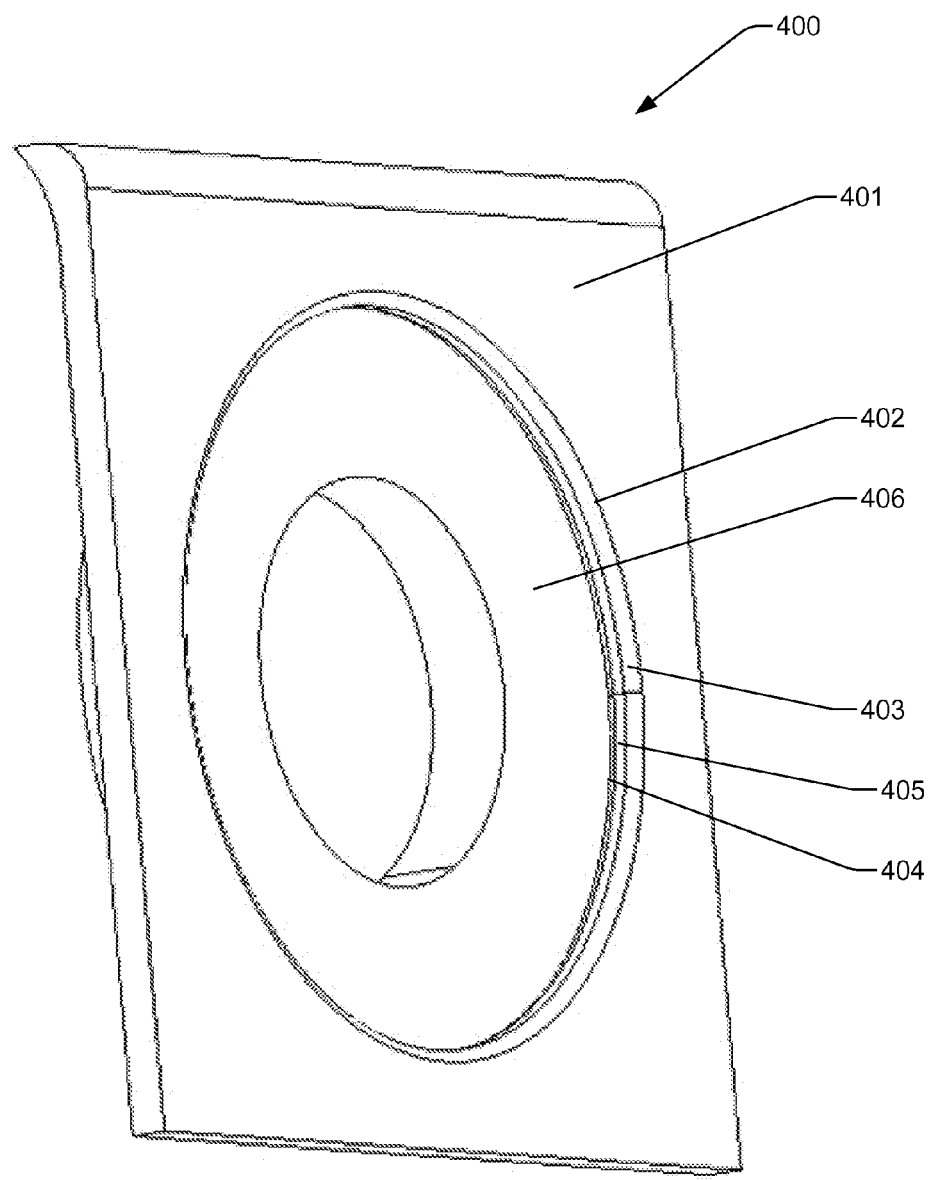
FIG. 4 illustrates a bottom perspective view of an example of a retention plate and a fastening element retained by the retention plate, in accordance with some embodiments.

FIG. 4 illustrates a detailed view of an example of a retention plate and a fastening element that may be retained by the retention plate, in accordance with some embodiments. As similarly discussed above with reference to retention plate 110, retention plate 401 may be a part of a retention tool and may be used to retain or hold at least one fastening element within the retention tool. In the example illustrated in FIG. 4, retention plate 401 is configure to retain and hold fastening element 406, which may be a washer included in a stack-up. As similarly discussed above, retention plate 401 may include edge 402 that defines an opening through which one or more fastening elements may be inserted. The diameter of edge 402 may be smaller than an outer diameter of fastening element 406, thus facilitating retention of fastening element 406 in the retention tool.

In various embodiments, edge 402 may have different profiles. For example, edge 402 may be flat or may be tapered. As shown in FIG. 4, edge 402 may be a composite of a plurality of profiles. For example, edge 402 may include first tapered edge 403, second tapered edge 404, and ridge 405. First tapered edge 403 may be configured to determine, at least in part, a first resistance to insertion of a fastening element in a first direction. Thus, adjusting one or more parameters, such as the angle of taper, the size, and the flexibility of first tapered edge 403 may increase or decrease the first resistance. For example, the first resistance may be increased by increasing the size and/or decreasing the flexibility of first tapered edge 403. Similarly, second tapered edge 404 may be configured to determine, at least in part, a second resistance to removal or release of the fastening element in a second direction. As similarly discussed above, adjusting one or more parameters of second tapered edge 404 may increase or decrease the second resistance. Ridge 405 may be a structural element that affects both the first and second resistance. One or more parameters, such as a size and roundness, of ridge 405 may be configured to adjust or modify both the first and second resistance. It will be appreciated that other material properties, such as elasticity, of one or more of first tapered edge 403, second tapered edge 404, and ridge 405 may be modified and configured to adjust and configure the first and second resistances as well. Moreover, as similarly discussed above, the geometry of an opening defined by edge 402, first tapered edge 403, second tapered edge 404, and ridge 405 may be square or any other shape that matches a geometry of a fastening element.

Figure 5:
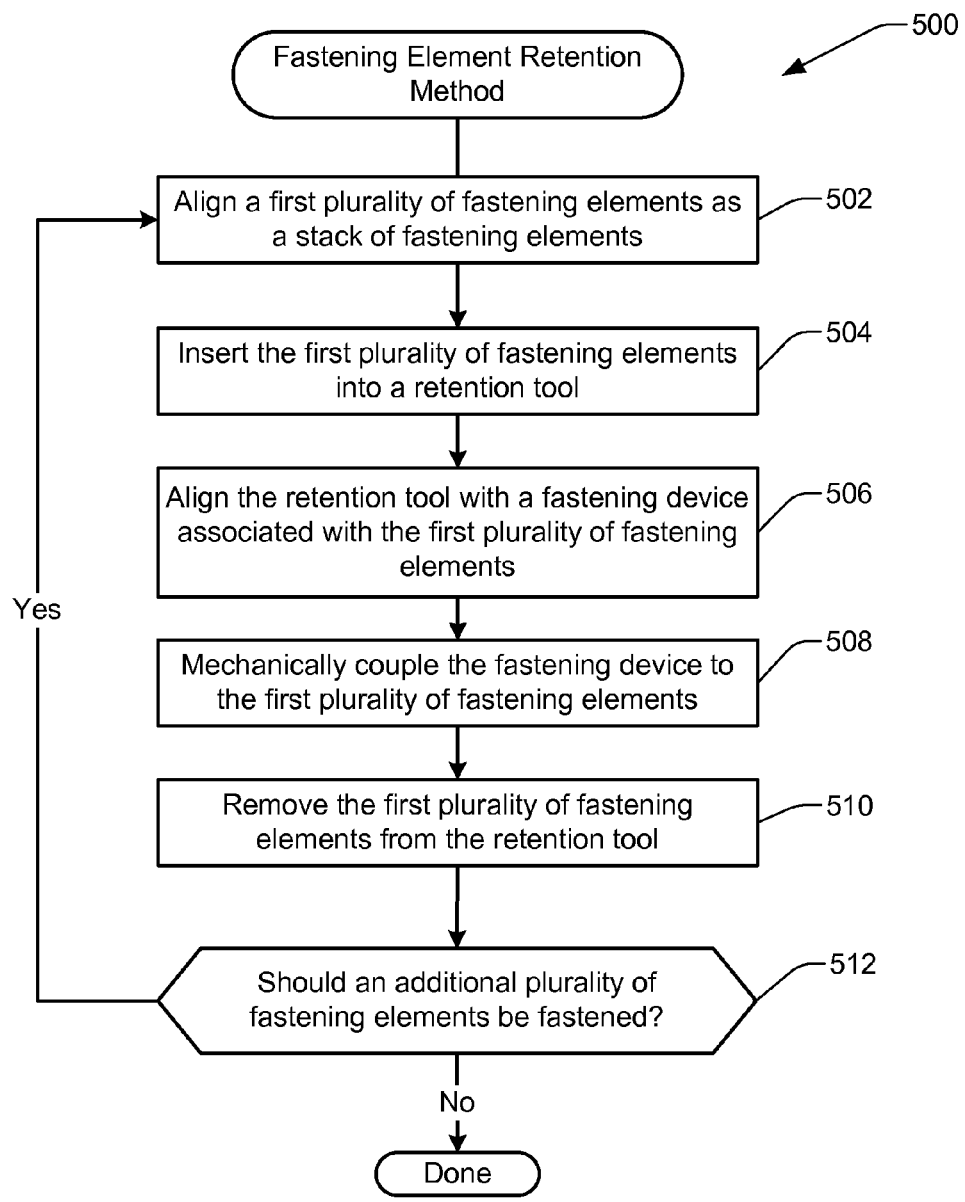
FIG. 5 illustrates a flow chart of an example of a method for using a retention tool to retain and fasten one or more fastening elements during an assembly process, in accordance with some embodiments.

FIG. 5 illustrates a flow chart of an example of a method for using a retention tool to retain one or more fastening elements during an assembly process, in accordance with some embodiments. Method 500 may be part of an assembly, installation, or maintenance process performed on a machine or vehicle, such as an airplane. As similarly discussed above, an airplane or other vehicle may have various components assembled and held together using fasteners, which may include fastening elements and devices such as washers, nuts, and bolts. For example, exterior surfaces and interior surfaces of airplanes may include many pieces of metal or carbon fiber held together by numerous fastened bolts. Due to the unique geometry of these vehicles, access to one side of the surface being assembled may be blind and only accessible via small access compartments. Thus, a retention tool may be used to securely retain or hold a plurality of fastening elements in place on a blind side of the surface, while a fastening device is used to fasten the fastening elements.

Accordingly, at step 502, a first plurality of fastening elements may be aligned and arranged as a stack of fastening elements. As previously discussed, fastening elements may be nuts, washers, and other structural elements that may be used to fasten a joint or seam that may, for example, exist between two pieces or components of a section of a fuselage or empennage of an airplane. Each of the fastening elements may have a hole or opening in its center. The holes may be concentric so that a fastening device, such as a bolt, may be inserted and threaded through the fastening elements. Thus, the first plurality of fastening elements may be aligned so that the holes for each of the first plurality of fastening elements are aligned with each other to form a columnar hole through the entire stack of fastening elements.

At step 504, the first plurality of fastening elements may be inserted into a retention tool. The first plurality of fastening elements may be inserted through a retention plate of the retention tool and into a housing of the retention tool. In various embodiments, the insertion may occur via an application of a first force to the first plurality of fastening elements. The application of the first force may be sufficient to overcome a first resistance of the retention plate and may push the first plurality of fastening elements into the retention tool. For example, a user of the retention tool may manually manipulate and position the stack of fastening elements, which may include several washers and a nut. The user may align the stack with an opening in the retention plate and apply the first force to push the stack through the retention plate and into the retention tool.

At step 506, the retention tool may be aligned with a fastening device associated with the first plurality of fastening elements. As previously discussed, a fastening device may be a structural member configured to be fastened to the one or more fastening elements. For example, if the fastening elements are nuts and washers, the fastening device may be a bolt. Accordingly, aligning the retention tool with the fastening device may be accomplished by aligning the opening of the retention plate and the center of the first plurality of fastening elements with the center of the fastening device.

At step 508, the first plurality of fastening elements may be mechanically coupled to the fastening device. Accordingly, the fastening device, which may be a bolt, may be inserted and threaded through the first plurality of fastening devices, which may include a nut and a washer. This may be accomplished by maintaining the position of the retention tool and the first plurality of fastening devices within the retention tool, and manipulating the fastening device by, for example, turning the head of the bolt. In this way, the user may grasp a handle of the retention tool and use the handle to prevent rotation or movement of the tool. As similarly discussed above, this may be made possible by the coupling between the housing and/or torque restrictor and the first plurality of fastening elements.

At step 510, the first plurality of fastening elements may be removed from the retention tool. In some embodiments, a second force may be applied that removes the first plurality of fastening elements from the retention tool. The second force may be generated by the coupling between the fastening elements and the fastening device. For example, the fastening elements may include a threaded nut. The fastening device may be a threaded bolt. A rotation of the bolt may thread the bolt through the nut and pull the nut towards the head of the bolt, thus generating the second force. In various embodiments, once the second force is greater than a second resistance of the retention plate, the first plurality of fastening elements may be pulled through the retention plate and may be removed from the retention tool.

At step 512, it may be determined whether or not additional pluralities of fastening elements should be fastened. In some embodiments, the joint or seam that is being assembled may include several fastening points. Thus, several iterations of method 500 may be utilized to fasten the entire joint or seam and to ensure that all fastening points are fastened. For example, the joint may be a joint in a section of an airplane that includes 15 bolts. In this example, additional iterations of method 500 may be utilized to fasten all 15 bolts. Accordingly, if it is determined that an additional plurality of fastening elements should be fastened, method 500 may return to step 502. If it is determined that an additional plurality of fastening elements should not be fastened, method 500 may terminate.

While method 500 has been described with reference to one stack of fastening elements, multiple stacks may be processed at the same time in accordance with method 500. For example, a retention tool with multiple sockets may be used to fasten multiple stacks of fastening elements concurrently. Moreover, while various embodiments disclosed herein have been described with reference to an assembly process, the methodologies described herein may also be applicable to any process in which fastening occurs. Further still, while various embodiments have been described with reference to airplanes and the aerospace industry, it will be appreciated that the embodiments disclosed herein may be applied to any other context as well, such as automotive, railroad, and other mechanical and vehicular contexts.

Figure 6:
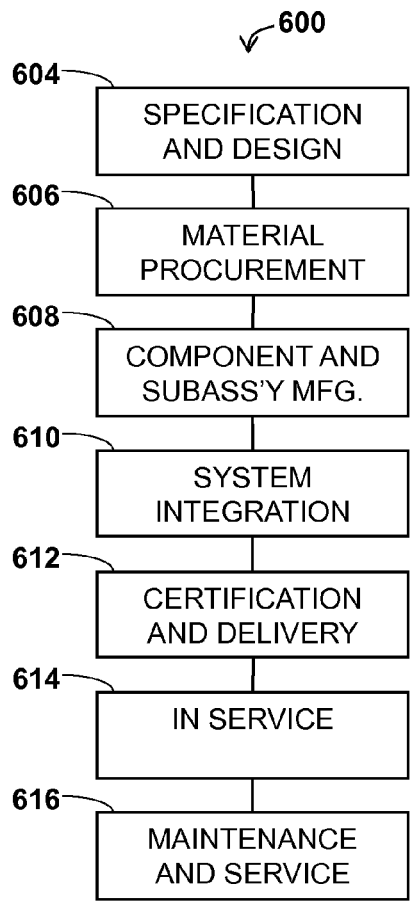
FIG. 6 illustrates a flow chart of an example of an aircraft production and service methodology, in accordance with some embodiments.
Figure 7:
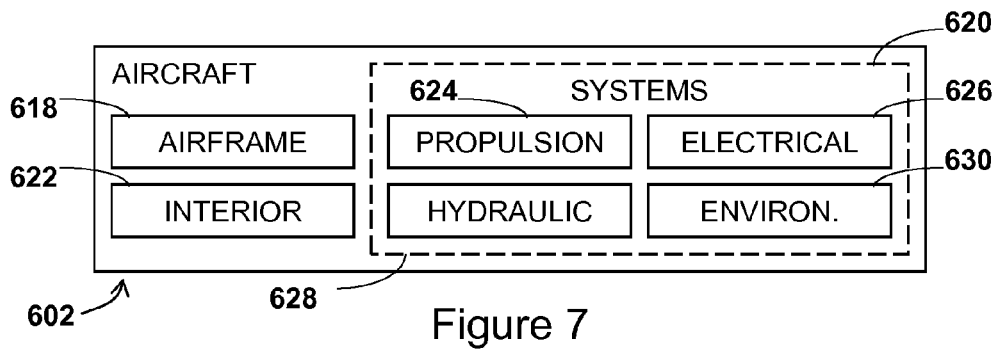
FIG. 7 illustrates a block diagram of an example of an aircraft, in accordance with some embodiments.

Accordingly, embodiments of the disclosure may be described in the context of an aircraft manufacturing and service method 600 as shown in FIG. 6 and an aircraft 602 as shown in FIG. 7. During pre-production, exemplary method 600 may include specification and design 604 of the aircraft 602 and material procurement 606. During production, component and subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 602 produced by exemplary method 600 may include an airframe 618 with a plurality of systems 620 and an interior 622. Examples of high-level systems 620 include one or more of a propulsion system 624, an electrical system 626, a hydraulic system 626, and an environmental system 630. Any number of other systems may be included. Although an aerospace example is shown, the principles of the invention may be applied to other industries, such as the automotive industry.

Apparatus and methods embodied herein may be employed during any one or more of the stages of the production and service method 600. For example, components or subassemblies corresponding to production process 608 may be fabricated or manufactured in a manner similar to components or subassemblies produced while the aircraft 602 is in service. Also, one or more apparatus embodiments, method embodiments, or a combination thereof may be utilized during the production stages 608 and 610, for example, by substantially expediting assembly of or reducing the cost of an aircraft 602. Similarly, one or more of apparatus embodiments, method embodiments, or a combination thereof may be utilized while the aircraft 602 is in service, for example and without limitation, to maintenance and service 616.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. An apparatus for retaining and releasing at least one fastening element, the apparatus comprising:
    a housing including a first socket, the first socket being a cavity configured to receive and hold the at least one fastening element;
    a torque restrictor coupled to the housing and located adjacent to the first socket, the torque restrictor being configured to transfer a rotational force to the at least one fastening element; and
    a retention plate coupled to the housing and configured to retain the at least one fastening element in the first socket in response to a first force, and further configured to release the at least one fastening element from the first socket in response to a second force, the retention plate having a first resistance enabling the insertion of the at least one fastening element into the first socket in a first direction in response to a first application of the first force, and the retention plate having a second resistance enabling the removal of the at least one fastening element from the first socket in a second direction in response to a second application of the second force.

2. The apparatus of claim 1, wherein the retention plate is made of at least one material selected from the group consisting of a metal, a metal alloy, a polymer-based plastic, and forged steel.

3. The apparatus of claim 1, wherein the retention plate includes an edge defining an opening, wherein the edge has at least a tapered profile.

4. The apparatus of claim 1, wherein the torque restrictor is included in the housing.

5. The apparatus of claim 1, wherein the torque restrictor comprises a different material than the housing.

6. The apparatus of claim 1, wherein the housing further comprises a handle coupled to the first socket.

7. The apparatus of claim 6, wherein a length and an angle associated with a geometry of the handle is configured to fit within one or more dimensions of an access compartment of an airplane.

8. The apparatus of claim 1, wherein the housing further comprises a plurality of sockets configured to receive a plurality of fastening elements, wherein the plurality of sockets includes a second socket and a third socket.

9. The apparatus of claim 8, wherein a distance between each of the first socket, the second socket, and the third socket is configured to match a distance between each of a plurality of fastening devices included in a component of an airplane, and wherein a curvature of the housing is configured to match a curvature of the component.

10. The apparatus of claim 1 further comprising an overmold that covers the housing, wherein the overmold is made of the same material as the retention plate, and wherein the retention plate is included in the overmold.

11. A system for retaining and releasing at least one fastening element, the system comprising:
    a housing including a first socket, the first socket being a cavity configured to receive and hold the at least one fastening element;
    a torque restrictor coupled to the housing and located adjacent to the first socket, the torque restrictor being configured to transfer a rotational force to the at least one fastening element;
    a handle coupled to the housing and configured to transfer a rotational force to the housing; and
    a retention plate coupled to the housing and configured to retain the at least one fastening element in the first socket in response to a first force, and further configured to release the at least one fastening element from the first socket in response to a second force, the retention plate having a first resistance enabling the insertion of the at least one fastening element into the first socket in a first direction in response to a first application of a first force, and the retention plate having a second resistance enabling the removal of the at least one fastening element from the first socket in a second direction in response to a second application of a second force.

12. The system of claim 11, wherein the retention plate includes an edge defining an opening, wherein the edge has at least a tapered profile.

13. The system of claim 11, wherein the handle is removably coupled to the housing.

14. The system of claim 11, wherein a length and an angle associated with a geometry of the handle is configured to fit within one or more dimensions of an access compartment of an airplane.

15. The system of claim 11, wherein the housing further comprises a plurality of sockets configured to receive a plurality of fastening elements, wherein the plurality of sockets includes a second socket and a third socket.

16. The system of claim 15, wherein a distance between each of the first socket, the second socket, and the third socket is configured to match a distance between each of a plurality of fastening devices included in a component of an airplane, and wherein a curvature of the housing is configured to match a curvature of the component.

* * * * *